United States Patent [19]
Okada et al.

[11] Patent Number: 5,719,651
[45] Date of Patent: Feb. 17, 1998

[54] LIQUID CRYSTAL DISPLAY DEVICE IN WHICH ONE SUBPIXEL HAS A DIMENSION SMALLER THAN THE MINIMUM SEPARATION DISTANCE BETWEEN DOMAINS

[75] Inventors: Shinjiro Okada, Isehara; Yutaka Inaba, Kawaguchi; Kazunori Katakura, Atsugi, all of Japan

[73] Assignee: Canon Kabushiki Kaisha, Tokyo, Japan

[21] Appl. No.: 837,213

[22] Filed: Apr. 22, 1997

Related U.S. Application Data

[63] Continuation of Ser. No. 122,937, Sep. 20, 1993, abandoned.

[30] Foreign Application Priority Data

Sep. 21, 1992 [JP] Japan ................... 4-274876

[51] Int. Cl.$^6$ ................ G02F 1/1333; G02F 1/1343; G09G 5/10
[52] U.S. Cl. .................... 349/85; 349/144; 345/149
[58] Field of Search .................... 359/100, 56, 67, 359/87; 345/89, 97, 149; 349/144, 85, 33

[56] References Cited

U.S. PATENT DOCUMENTS

| | | | |
|---|---|---|---|
| 4,712,877 | 12/1987 | Okada et al. | 359/100 |
| 5,103,329 | 4/1992 | Clark et al. | 359/100 |
| 5,208,689 | 5/1993 | Hartmann et al. | 349/144 |
| 5,212,575 | 5/1993 | Kojima et al. | 359/82 |
| 5,264,954 | 11/1993 | Okada | 359/100 |
| 5,309,264 | 5/1994 | Lien et al. | 359/87 |
| 5,317,437 | 5/1994 | Katakura | 359/54 |
| 5,347,393 | 9/1994 | Van Haaren et al. | 359/87 |
| 5,499,037 | 3/1996 | Nakagawa et al. | 345/89 |

FOREIGN PATENT DOCUMENTS 61-94023  5/1986  Japan .

OTHER PUBLICATIONS

Clark et al., Mol. Cryst. Liq. Cryst., vol. 94 (1983) 213–34.

*Primary Examiner*—William L. Sikes
*Assistant Examiner*—Walter Malinowski
*Attorney, Agent, or Firm*—Fitzpatrick, Cella, Harper & Scinto

[57] ABSTRACT

A ferroelectric liquid crystal device in which a ferroelectric liquid crystal is interposed between a pair of electrode substrates facing each other, and in which pixels are formed at intersections of upper and lower electrodes. A threshold gradient is provided in each pixel, and a light-shielding electrode portion is formed along at least a part of the periphery of each pixel so that no domain wall is formed at the boundary between the shielding electrode portion and a pixel portion adjacent to the shielding electrode portion.

2 Claims, 11 Drawing Sheets

$V = 0$ $V < V_{th}$ $V_{th} < V < V_{sat}$ $V_{sat} < V$

FIG. 6(a) PRIOR ART
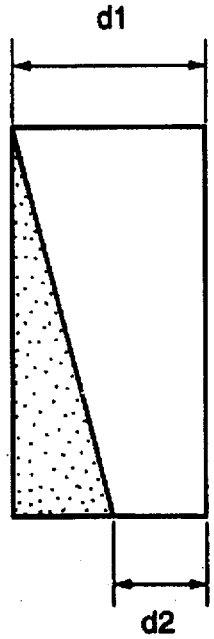
FIG. 6(b) PRIOR ART
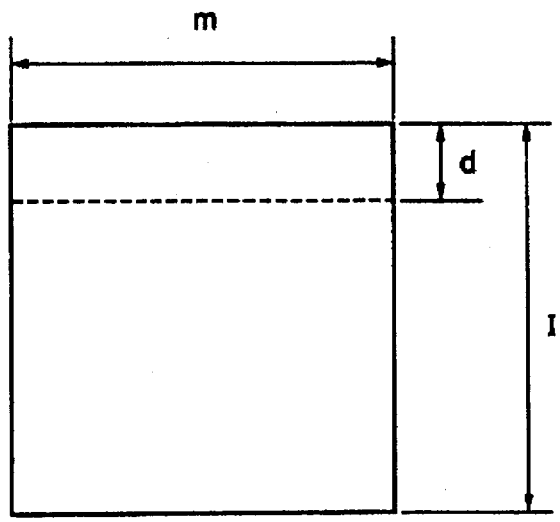
FIG. 6(c)
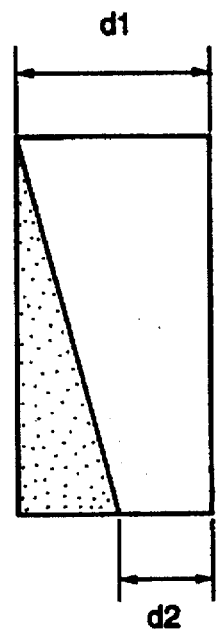
FIG. 6(d)
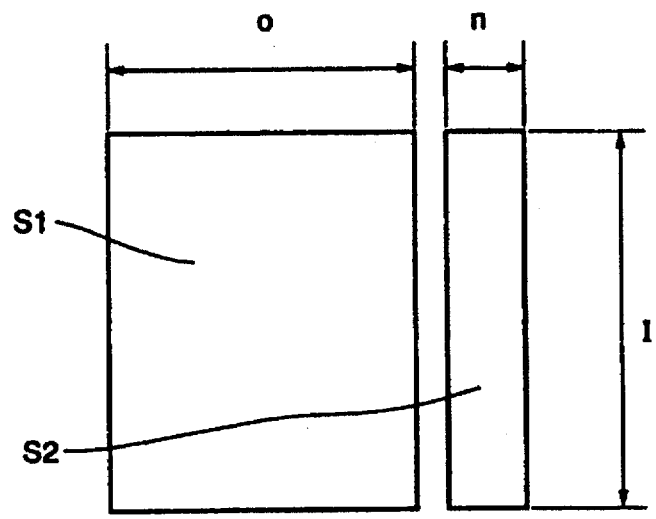
m = o + n

FIG. 7(a)
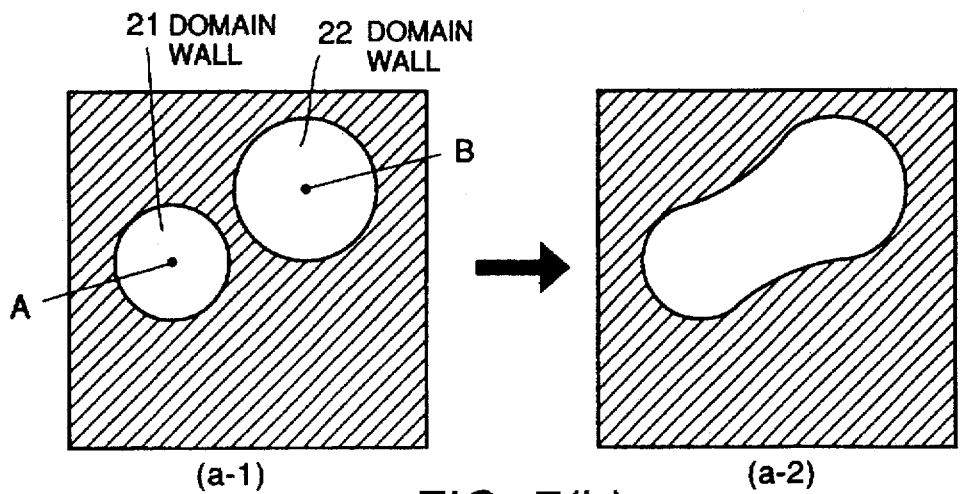
FIG. 7(b)
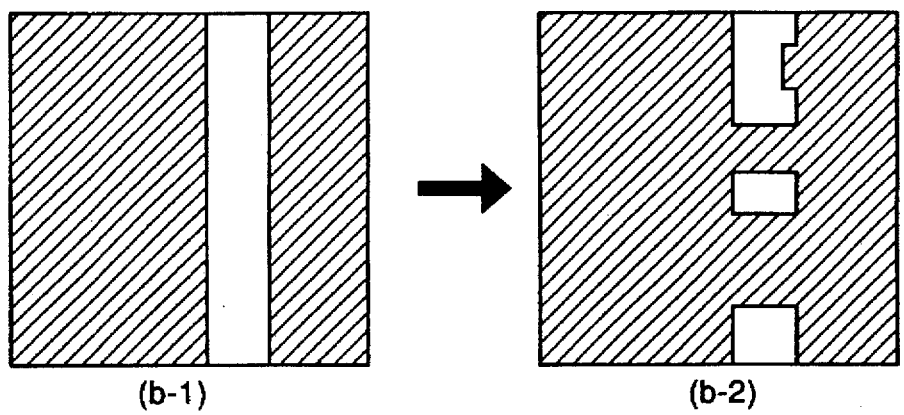
FIG. 8(a)   FIG. 8(b)   FIG. 8(c)
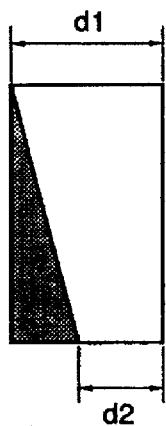 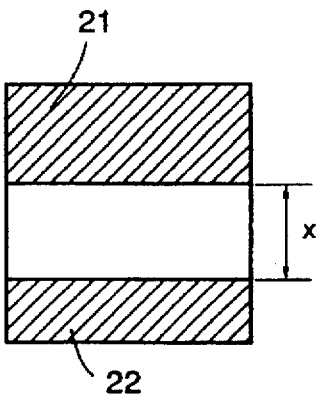 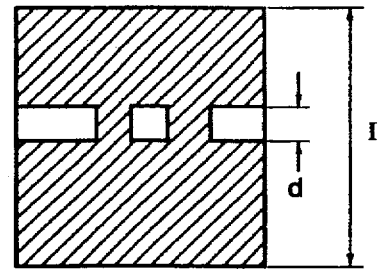

FIG. 9(a1) PRIOR ART | FIG. 9(a2) PRIOR ART | FIG. 9(a3) PRIOR ART | FIG. 9(a4) PRIOR ART
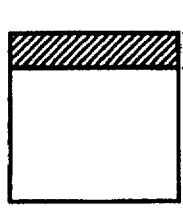 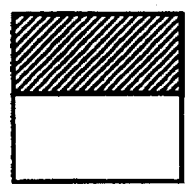 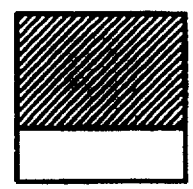 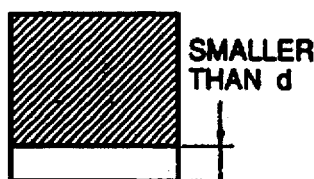
SMALLER THAN d (a1); SMALLER THAN d (a4)
FIG. 9(b1) | FIG. 9(b2) | FIG. 9(b3) | FIG. 9(b4)
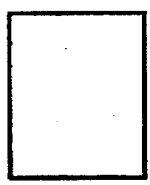 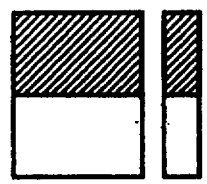 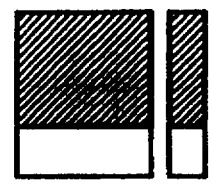 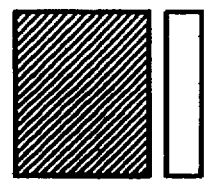
FIG. 9(c1) PRIOR ART | FIG. 9(c2) PRIOR ART | FIG. 9(c3) PRIOR ART | FIG. 9(c4)
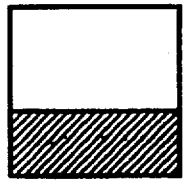 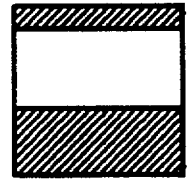 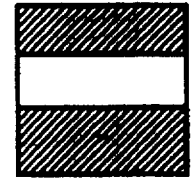 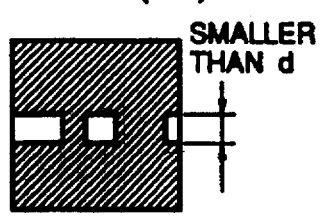
SMALLER THAN d (c4)
FIG. 9(d1) | FIG. 9(d2) | FIG. 9(d3) | FIG. 9(d4)
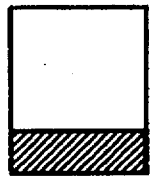 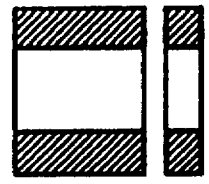 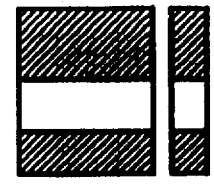 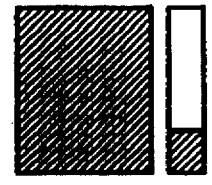

- 61 ITO ELECTRODE
- 62 INFORMATION SIGNAL ELECTRODE SUBSTRATE

- 63 SCANNING SIGNAL ELECTRODE SUBSTRATE
- 64 SLOPES FOR CELL THICKNESS GRADIENT
- 61 ITO ELECTRODE

/ 1

LIQUID CRYSTAL DISPLAY DEVICE IN WHICH ONE SUBPIXEL HAS A DIMENSION SMALLER THAN THE MINIMUM SEPARATION DISTANCE BETWEEN DOMAINS

This application is a continuation of application Ser. No. 08/122,937, filed Sep. 20, 1993, now abandoned.

BACKGROUND OF THE INVENTION

1. Field of the Invention

This invention relates to a liquid crystal display device using a ferroelectric liquid crystal (FLC) and, more particularly, to a liquid crystal display device having a matrix drive system capable of a gradation display.

2. Description of the Related Art

A display device using a ferroelectric liquid crystal (FLC), such as one disclosed in Japanese Patent Laid-Open Publication Sho 61-94023, is known in which a ferroelectric liquid crystal is injected into liquid crystal cells which are formed in such a manner that a pair of glass substrates having transparent electrodes and oriented are disposed so as to set a cell gap of about 1 to 3 μm therebetween with the electrodes facing inwardly.

This type of display device using a ferroelectric liquid crystal has two features. That is, a ferroelectric liquid crystal has spontaneous polarization and coupling between an external electric field and the spontaneous polarization can be used for switching. Also, switching can be performed in accordance with the polarity of an external electrode since the direction of the longitudinal axis of ferroelectric liquid crystal molecules corresponds to the direction Of spontaneous polarization in a one to one relationship.

Ferroelectric liquid crystals are ordinarily formed of chiral smectic liquid crystals (SmC* SmH*) and, therefore, have an orientation in a bulk state such that the liquid crystal longitudinal axis is twisted. However, if such a ferroelectric liquid crystal is injected into a cell having a cell gap of about 1 to 3 μm as described above, the twist of the liquid crystal longitudinal axis can be cancelled. This phenomenon has been reported by N. A. Clark et al., MCLC, 1983, Vol 94, p213 to p234.

Ferroelectric liquid crystals are mainly used as two-value (bright-dark) display devices having two stable states, i.e., a light transmitting state and a light shielding state but can also be used for a multi-value display or a half tone display. In one of half tone display methods, the ratio of areas of bistable states (light transmitting state and light shielding state) in a pixel is controlled to achieve an intermediate light transmitting state. Such a gradation display method (hereinafter referred to as an area modulation method) will be described below in detail.

FIG. 1 is a schematic diagram of the relationship between a switching pulse voltage V and the quantity of transmitted light I of a ferroelectric liquid crystal device. In FIG. 1, the change in the transmitted light quantity I when a single-shot pulse of one polarity is applied to a pixel which has been in a state of completely shielding light (dark state) is plotted as a function of the voltage V of the single-shot pulse. When the pulse voltage V is lower than a threshold value $V_{th}$ ($V<V_{th}$), the quantity of transmitted light is not changed and the transmitting state after the application of the pulse, observed as shown in FIG. 2(b), is the same as the state before the application observed as shown in FIG. 2(a). When the pulse voltage V exceeds the threshold value $V_{th}$ ($V_{th}<V$), a part of the pixel is changed into the other stable state, i.e., the light transmitting state, as shown in FIG. 2(c), and the pixel as a whole has an intermediate quantity of light. When the pulse voltage V is further increased above a saturated value $V_{sat}$ ($V_{sat}<V$), the pixel is entirely set in the light transmitting state, as shown in FIG. 2(d). Correspondingly, the quantity of light becomes equal to a constant value (saturated).

That is, in the area gradation method, the voltage applied to the pixel is controlled so that the pulse voltage V satisfies $V_{th}<V<V_{sat}$ to display a half tone corresponding to the pulse voltage.

The above-described simple driving method, however, entails a problem described below. That is, the relationship between the voltage and the quantity of transmitted light, shown in FIG. 1, depends upon the cell thickness and temperature. Therefore, if there is a non-uniform cell thickness distribution or temperature distribution in a display panel, there is a possibility of occurrence of a gradation non-uniformity between different places in the display panel when a pulse having a constant voltage is applied.

FIG. 3 is a graph for explanation of this problem, showing the relationship between pulse voltage V and transmitted light quantity I, as in FIG. 1. In FIG. 3, the relationship therebetween with respect to different temperatures is shown, that is, lines H and L indicating the relationship at a high temperature and a low temperature, respectively, are illustrated. Ordinarily, a non-uniform temperature distribution occurs easily in one display panel if the display size is large. Accordingly, in a case where a half tone is displayed by a certain drive voltage $V_{ap}$, the half tone level varies through the range of $I_1$ to $I_2$ in the same panel, as shown in FIG. 3, resulting in failure to achieve a uniform gradation display state.

To solve the above-described problem, the applicant of the present invention has already proposed a drive method called four-pulse method. In the four-pulse method, as shown in FIGS. 4 and 5, a plurality of pulses (pulses A, B, C, and D shown in FIG. 4) are applied to all of a plurality of pixels arranged on the same scanning line in one panel and having threshold values different from each other to obtain equal quantities of transmitted light as a whole, as shown in FIG. 5. In FIG. 4, $T_1$, $T_2$, and $T_3$ represent times set in synchronization with pulses (B), (C), and (D). In FIG. 5, $Q_0$, $Q_0'$, $Q_1$, $Q_2$, and $Q_3$ represent gradation levels of the pixels, $Q_0$ represents black (0%) and $Q_0'$ represents white (100%). The pixels shown in FIG. 5 have internal threshold distributions in which threshold values are increased in the direction toward the left hand side of FIG. 5 (from $V_{th}$ to $V_{sat}$).

The applicant of the present invention has also proposed a drive method called pixel shift method before the present invention. In the pixel shift method, a gradation display is effected by simultaneously inputting different scanning signals selectively to a plurality of scanning signal lines so that an electric field strength distribution is formed over the plurality of scanning lines.

According to this method, a change in threshold due to a temperature change can be absorbed by shifting a writing area over a plurality of scanning lines.

Such drive methods (four-pulse method, pixel shift method) are effective in a case where there is a uniform threshold distribution in a pixel, and are suitable for driving a cell having a cell thickness gradation such as that shown in FIG. 6.

The gradation display method based on forming a plurality of domains in a pixel to control the quantity of light transmitted through the pixel entails the problem of a phenomenon that two domains walls unite with each other if they are brought closer to each other so that the distance therebetween is smaller than d, as shown in FIGS. 7(a) and 7(b). FIG. 7(a) shows a phenomenon that, during a process in which nuclei are generated at two peculiar points A and B in a pixel and in which domain walls are extended therefrom, domain walls of domains 21 and 22 generated from the points A and B in a pixel unite with each other as shown in (a-2) if the distance between the domain walls becomes smaller than a certain value d. This distance d varies depending upon the kind of orientation film (polyimide, SiO oblique evaporation and the like), the cell thickness and the stratum structure of a ferroelectric liquid crystal in $SmC^*$ phase (e.g., a chevron type, a bookshelf type, and a quasi bookshelf type). However, any domain wall has a closest-proximity domain distance d, which is a distance peculiar to its orientation. The existence of domain walls within the range of such a distance is very instable and depends upon a small change in the orientation film surface and the amount of reverse electric field when the voltage is not applied. Also, fluctuations of the probability of the existence are large.

FIG. 7(b) shows a situation where a domain wall grown one-dimensionally unites with an existing domain wall in a cell having a cell thickness gradient. In the case of a cell having a cell thickness gradient, an applied electric field strength is not evenly distributed but a closest-proximity domain distance d can also be defined. As described above, a plurality of domain walls must exist in a pixel in the case of using the four-pulse method or pixel shift method as a gradation drive method.

Moreover, if the closest-proximity domain distance d has a finite magnitude, proximity of domain walls within the range of the finite distance is impossible and the accuracy of gradation display is limited.

This problem will be described with reference to FIGS. 8(a) through 8(c). FIG. 8(a) is a cross-sectional view of a pixel in which the cell thickness is increased from the bottom to the top of the figure. When voltage V is applied, the electric field strength has a minimum value in a portion of a cell thickness d1 and a maximum value in a portion of a cell thickness d2. If data is written in such a pixel by, for example, the pixel shift method, two domain walls may be formed in the same pixel as shown in FIG. 8(b). If the length of the pixel in the direction of the cell thickness gradient is 1, and is the width of the white domain of the pixel shown in FIG. 8(b) in the cell thickness gradient direction is x, the ratio of the white domain and the black domain of the pixel is expressed as x/l×100 (%).

For a gradation display using this in-pixel reversal ratio (the ratio of the white domain and the black domain), the distance between two domain walls 21 and 22 shown in FIG. 8(b) must be stable if the two domain walls are controlled by a voltage. However, if the distance between the two domain walls is smaller than a certain distance d as shown in FIG. 8(c), the existence of the domain walls is very unstable and gradation driving cannot be performed stably. If the limit distance shown in FIG. 9(c) is d, the minimum unit of gradation display in this pixel is restricted by d and the number of gradation steps is limited to l/d. This is the problem of the gradation display method using mixed domain walls of a ferroelectric liquid crystal.

SUMMARY OF THE INVENTION

An object of the present invention is to provide a ferroelectric liquid crystal device in which a ferroelectric liquid crystal is interposed between a pair of electrode substrates facing each other, and in which pixels are formed at intersections of upper and lower electrodes, the liquid crystal device comprising a threshold gradient provided in each pixel, and a light-shielding electrode portion formed along at least a part of the periphery of each pixel so that no domain wall is formed at the boundary between the shielding electrode portion and a pixel portion adjacent to the shielding electrode portion.

Another object of the present invention is to provide a ferroelectric liquid crystal device comprising a pair of electrode substrates facing each other, a ferroelectric liquid crystal interposed between the pair of electrode substrates, and pixels formed at intersections of upper and lower electrodes, each pixel being formed of a plurality of sub pixels, wherein a voltage is applied so that the distance between domain walls is constant in sub pixels of each pixel except one sub pixel.

Still another object of the present invention is to provide a ferroelectric liquid crystal device comprising a pair of electrode substrates facing each other, a ferroelectric liquid crystal interposed between the pair of electrode substrates, pixels formed at intersections of upper and lower electrodes, a threshold gradient being provided in each pixel by forming a slope, each pixel being separated into a plurality of sub pixels parallel to the direction of the threshold gradient, wherein a voltage is applied so that the distance between domain walls is constant in sub pixels of each pixel except the sub pixel having the smallest electrode width. It is desirable that a light-shielding electrode portion is formed along at least a part of the periphery of each pixel so that no domain wall is formed at the boundary between the shielding electrode portion and a pixel portion adjacent to the shielding electrode portion. It is also desirable that the threshold gradient is provided by a cell thickness gradient. It is also desirable that the electrode width in a direction parallel to the direction of the threshold gradient is longer than the electrode width in a direction perpendicular to the direction of the threshold gradient.

BRIEF DESCRIPTION OF THE DRAWINGS

FIGS. 6(a) through 6(d) are diagrams of an pixel arrangement in accordance with the present invention;

FIGS. 7(a) and 7(b) are diagrams of unions of domain walls;

FIGS. 8(a) through 8(c) are diagrams of unions of domain walls in the case of the pixel shift method and the like;

FIGS. 9(a1), 9(a2), 9(a3), 9(a4), 9(b1), 9(b2), 9(b3), 9(b4), 9(c1), 9(c2), 9(c3), 9(c4), 9(d1), 9(d2), 9(d3) and 9(d4) are diagrams of the operation of the present invention;

DESCRIPTION OF THE PREFERRED EMBODIMENTS

Figure 1:
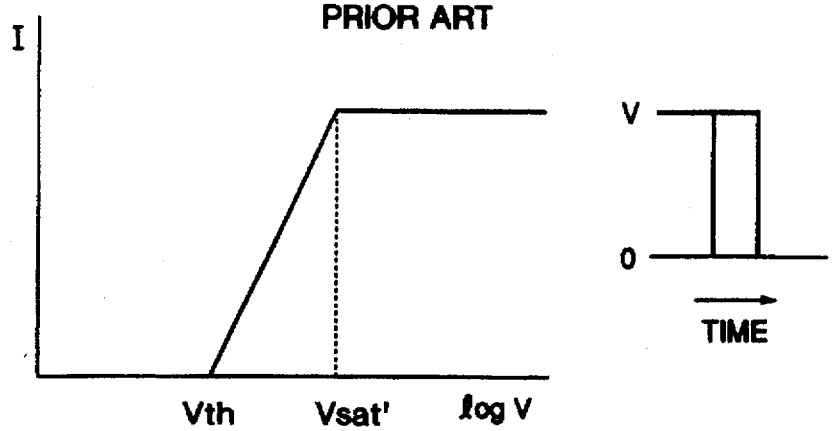
FIG. 1 is a schematic diagram of the relationship between a switching pulse voltage and the quantity of transmitted light of a ferroelectric liquid crystal device.
Figure 2A:
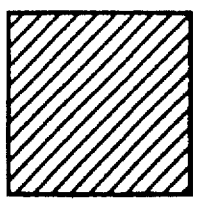
FIGS. 2(a), 2(b), 2(c) and 2(d) are diagrams of transmitted states caused by pulse voltages.
Figure 2B:
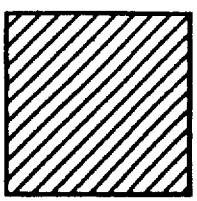
Figure 2C:
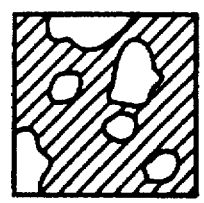
Figure 2D:
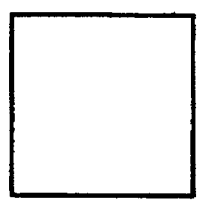
Figure 3:
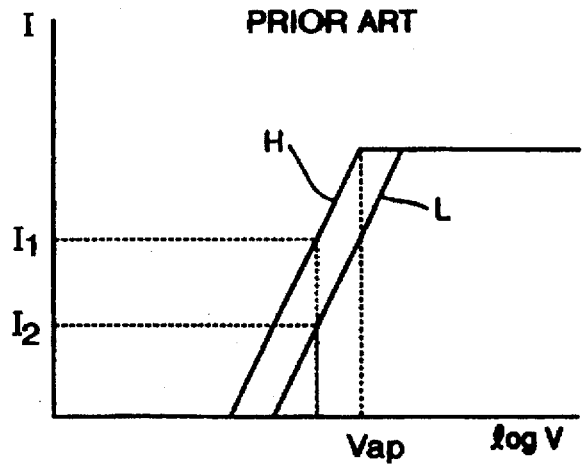
FIG. 3 is a diagram of a change in threshold characteristics depending upon a temperature distribution.
Figure 4:
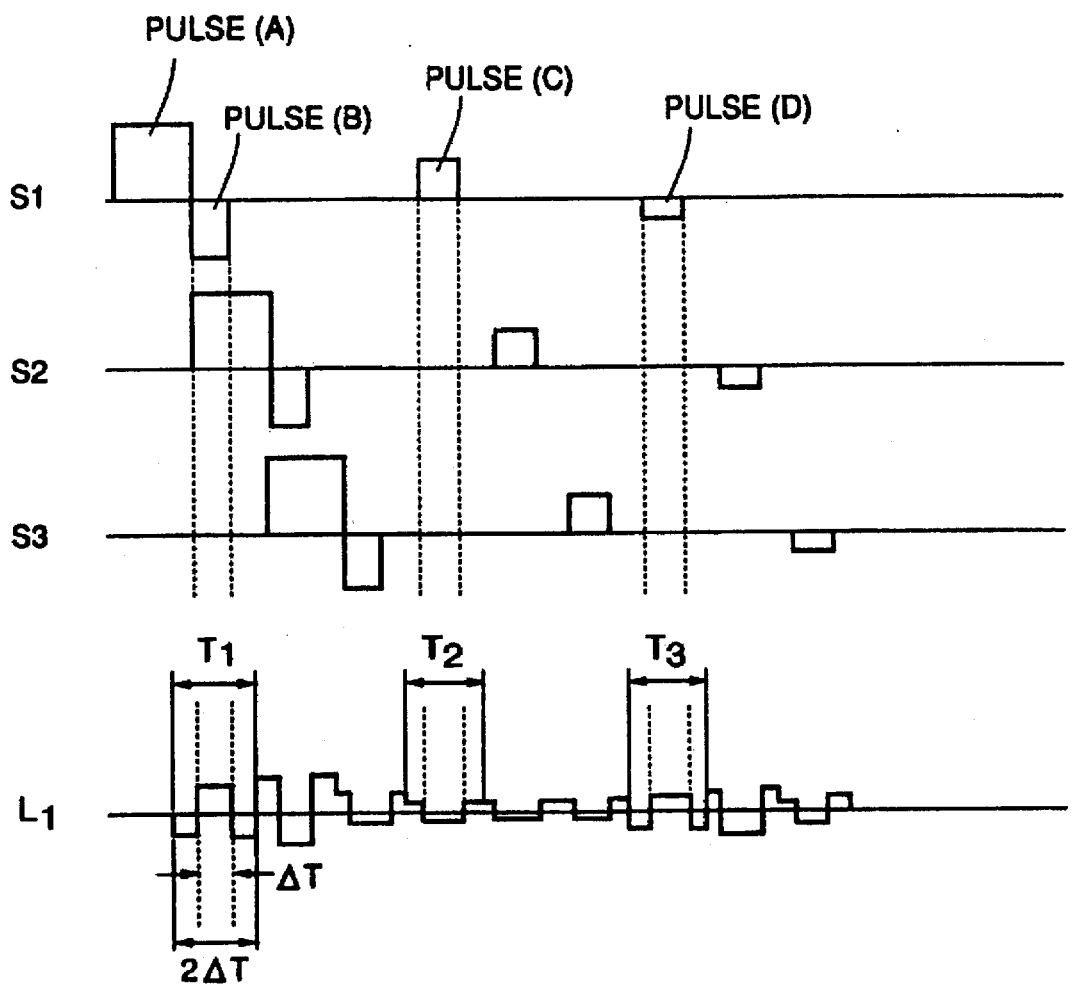
FIGS. 4 and 5 are diagrams of the four pulse method.
Figure 5:
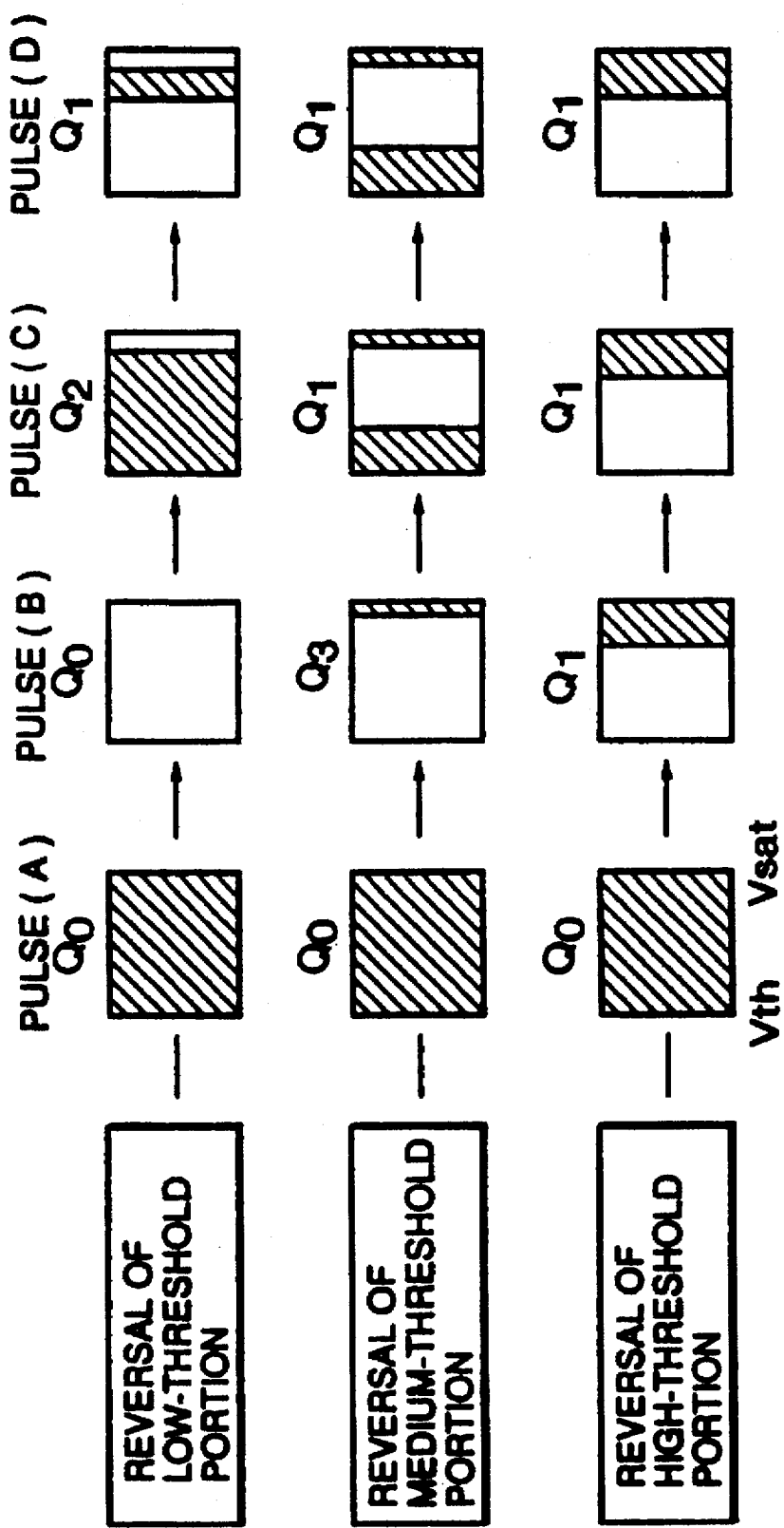

The present invention can be applied to a liquid crystal device having one-dimensional threshold distribution or electric field distribution at least locally. However, the present invention will be described with respect to a system having a cell thickness distribution formed in a pixel.

FIGS. 6(a) through 6(d) show the construction of a pixel electrode. FIG. 6(b) is a plan view of a pixel and FIG. 6(a) shows a cell thickness distribution in the pixel. If the size of the pixel in the direction of a gradient is l while the size in the direction perpendicular to the gradient direction is m, the pixel area is l×m. A distance d is a closest proximity distance at which adjacent domain walls can exist independently. This pixel is formed by electrodes sectioned as shown in FIG. 6(d). FIG. 6(c) shows a cell thickness distribution in the pixel. The length of the electrodes in the cell thickness gradient direction is l and the sum of electrode portions in the direction perpendicular to the thickness gradient direction is m (o+n=m). Accordingly, the areas of FIGS. 6(b) and 6(d) as total electrode areas are equal to each other.

As shown in FIG. 6(d), one pixel is formed by two sub pixels S1 and S2. As the relationship between the electrode widths n and m in the direction perpendicular to the cell thickness gradient direction of the sub pixels, n×l=m×d is preferred. However, d has a very small value depending upon the orientation and other factors, and it is therefore more preferable to set a relationship n×l>m×d, because this is easier to achieve in terms of manufacturing process. It is also possible to provide a plurality of pixel electrodes satisfying the relationship n×l<m×d. However, the sum of the areas of sectioned pixel electrodes must be m×d or greater. This is because the formation of a domain having a width smaller than d on a large-area sub pixel such as S1 in FIG. 6(d) must be avoided.

The operation of the present invention will be described below with reference to FIG. 9. A pixel arrangement corresponding to FIG. 6(b) is illustrated in (a1) to (a4) of FIG. 9, and an arrangement corresponding to FIG. 6d is illustrated in (b1) to (b4). In (a1) to (a4) and (b1) to b(4), states of pixels at a temperature T1° C. are illustrated. In the states (a1) and (b1), the transmission factor is 80%. In the states (a2) and (b2), the transmission factor is 50%. In the states (a3) and (b3), the transmission factor is 30%. In the states (a4) and (b4), the transmission factor is d/l×100% or less. In FIG. 9 are illustrated changes in domains with respect to a change in temperature (T1° to T2° C.) (T1<T2) in a case where data is written in pixels corresponding to (a1) to (a4) by the pixel shift method when the pixel on the next scanning line is 0%.

The pixel in the state (a4) has a domain having a width not greater than a closest proximity domain wall distance within the pixel area. However, the above-described domain instability can be avoided if an electrode arrangement is adopted such that liquid crystal molecules outside the pixel can be inverted as described later with respect to Embodiment 2. In such a cell, however, a problem described below is encountered when the temperature of the whole cell or the pixel rises from T1° to T2° C.

Pixels conventionally arranged in accordance with the arrangement shown in FIG. 6(b) are illustrated in (c1) to (c4) of FIG. 9. Pixels in accordance with the present invention, corresponding to FIG. 6(d), are illustrated in (d1) to (d4). In (c1) to (c4) and (d1) to d(4), states of pixels at a temperature T2° C. in the case of a gradation display using the above-described pixel shift method are illustrated.

In the states shown in (c1), (c2) and (c3) of FIG. 9, domain walls are sufficiently spaced apart from each other and do not unite with each other. In contrast, if the distance between domain walls is smaller than the closest proximity distance d as in the state shown in FIG. (c4), there is a possibility of occurrence of an uncertain union of domain walls depending upon pixel characteristics. It has already been stated that such a domain wall instability is undesirable for gradation display. The effect of the arrangement for solving this problem is as shown in (b1) to (b4) (T1° C.) and (d1 to (d4) (T2° C.). Gradation displays shown in (b2), (b3), (d2), and (d3) among those shown in (b1) to (b4) and (d1) to (d4) have no particular features beyond sectioning the pixel in comparison with the conventional arrangement. With respect to those shown in (b1), (b4), (d1) and (d4), however, a different method is used for writing in each pixel.

A black domain has a size smaller than the closest proximity distance d in (a1) of FIG. 9, while a white domain has a size smaller than the closest proximity distance d in (a4) of FIG. 9. In the case of such a gradation display, the pixel S1 shown in FIG. 6(d) is entirely made black or white, while the pixel S2 having a smaller area is made white or black reversely, as shown in (b1) and (b4). This operation is intended to avoid a situation where the domain distance becomes smaller than d. By successive writing in the sub pixel S2, a gradation display of d/l×100% or less can be effected. A domain smaller than the closest proximity distance d is finally formed in the pixel S2. However, the influence of the instability of such a portion upon the entire gradation display of the pixel is remarkably reduced in comparison with the conventional arrangement. This effect will be described with reference to (c1) to (c4) and (d1) to (d4) showing the pixel states at T2° C.

During driving based on the pixel shift method, a shift of a domain wall on a pixel electrode occurs with an increase in temperature. In such a situation, in the conventional arrangement, domain walls unite with each other as shown in (c4). In accordance with the present invention, data is written as shown in (b1) and (b4) at T1° C. (no domain having a width smaller than the closest proximity distance d is formed on the electrode S1) to ensure that, even if the temperature is changed, no domain wall is formed on the electrode S1 while a domain wall having a width equal to or greater than the closest proximity distance is formed on the electrode S2, as shown in (d1) and (d4), thereby preventing any union of domain walls.

However, as the density of writing on the electrode S2 is increased, a domain smaller than the closest proximity distance d is formed in the end to determine the gradation display accuracy. However, the accuracy thereby determined is remarkably improved in comparison with the conventional arrangement.

According to the conventional arrangement, if the closest proximity distance is d and if the electrode length in the cell thickness gradient direction is l, the minimum gradation unit is d/l×100%.

According to the present invention, referring to FIG. 6(d), the ratio of the area of the domain having a width d and formed on the pixel electrode S2 to the total area is expressed as $$d \cdot n / ((o+n) \cdot l) = (d \cdot n)/(m \cdot l),$$

and the gradation display minimum unit is dn/ml×100%. This is n/m of the minimum unit achieved by the conventional arrangement, i.e., d/l×100%.

The effect of the present invention will be described with respect to embodiments thereof.

(Embodiment 1)

Figure 10:
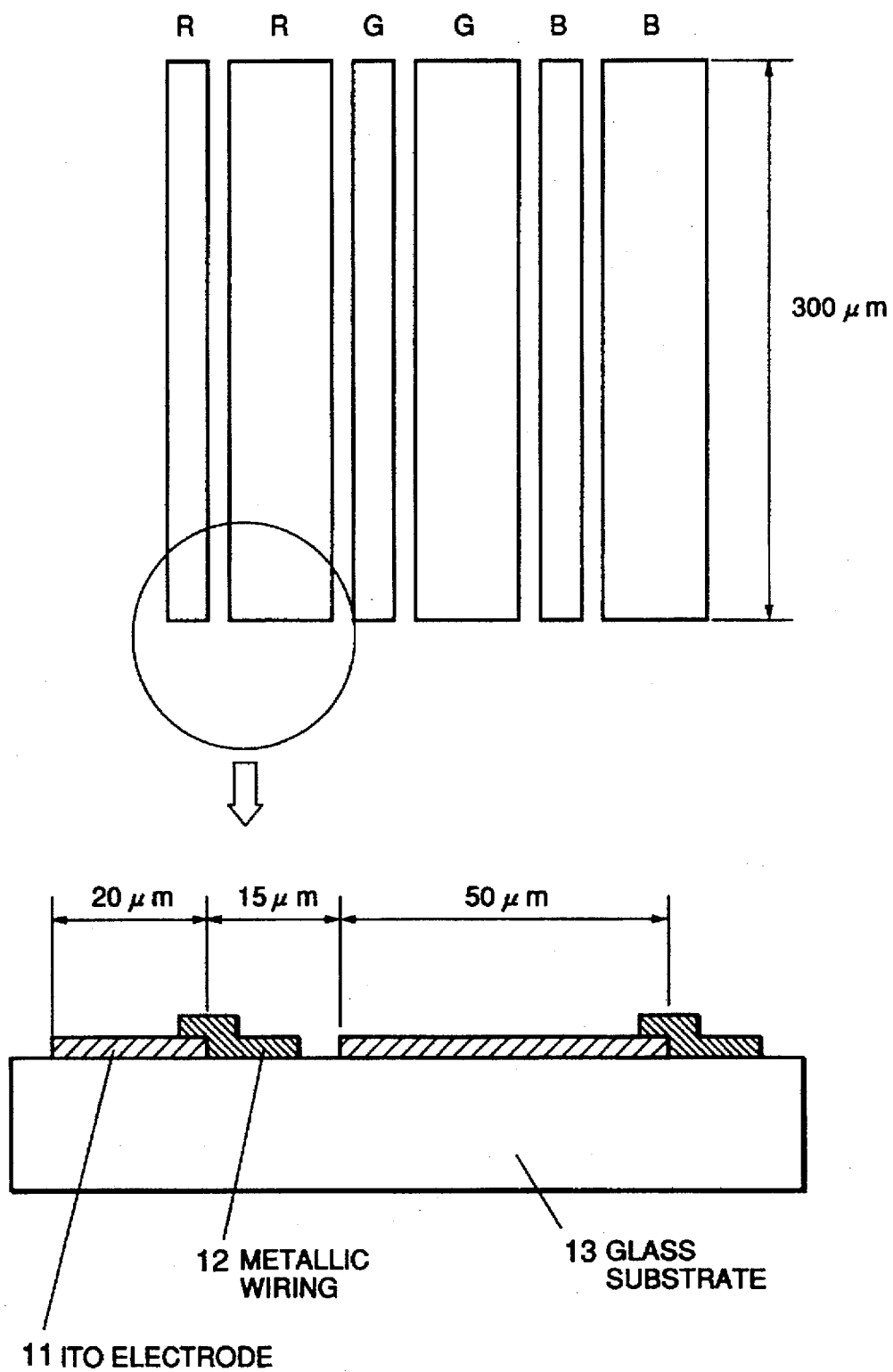
FIG. 10 is a diagram of a pixel arrangement of a first embodiment of the present invention.
Figure 11A:
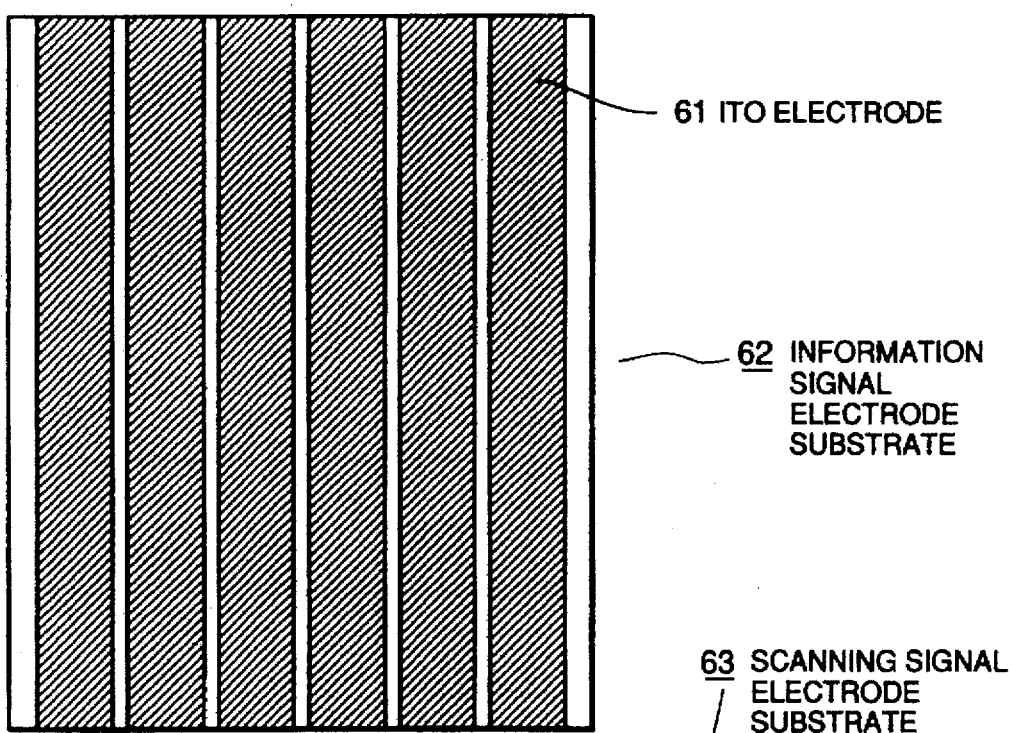
FIGS. 11(a) and 11(b) are diagrams of the electrode construction of the first embodiment.
Figure 11B:
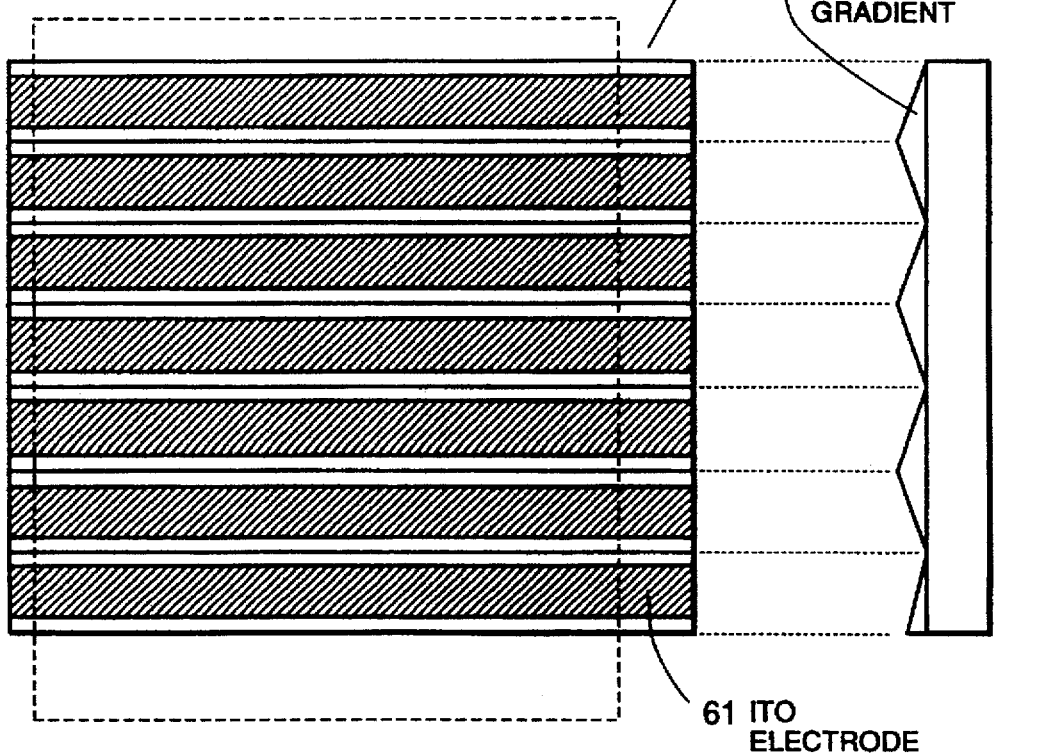

A liquid crystal cell, such as that shown in FIG. 10, having one pixel formed by six electrodes and having a cell thickness gradient along a longitudinal axis of the pixel in accordance with a first embodiment was manufactured. As shown in FIG. 10, six electrode portions are formed of three pairs of electrodes each consisting of a 20 µm wide electrode and a 50 µm wide electrode, and a red color filter (R), a green color filter (G) and a blue color filter (B) are provided in combination with the pairs of electrodes. Pixels are spaced apart from each other by 15 µm, and a metallic wiring (Mo: 1500 Å) is formed in contact with indium tin oxide (ITO) electrodes. A film of $Ta_2O_5$ having a thickness of about 500 Å was formed on an electrode substrate on which a pattern of electrodes are formed in this manner, and a polyimide orientation film LQ-1802, a product from Hitachi Kasei Kabushiki Kaisha, having a thickness of about 250 µm, was formed on the $Ta_2O_5$ film by application and was baked (270° C./1hr). This substrate was used as an information signal electrode substrate shown in FIG. 11(a), while a ridged electrode substrate shown in FIG. 12 was used as a scanning signal electrode substrate shown in FIG. 11(b). These substrates were combined so that the electrode surfaces face each other as indicated by the broken line in FIG. 11. (d1=1.1 µm, d2=1.65 µm)

Figure 12:
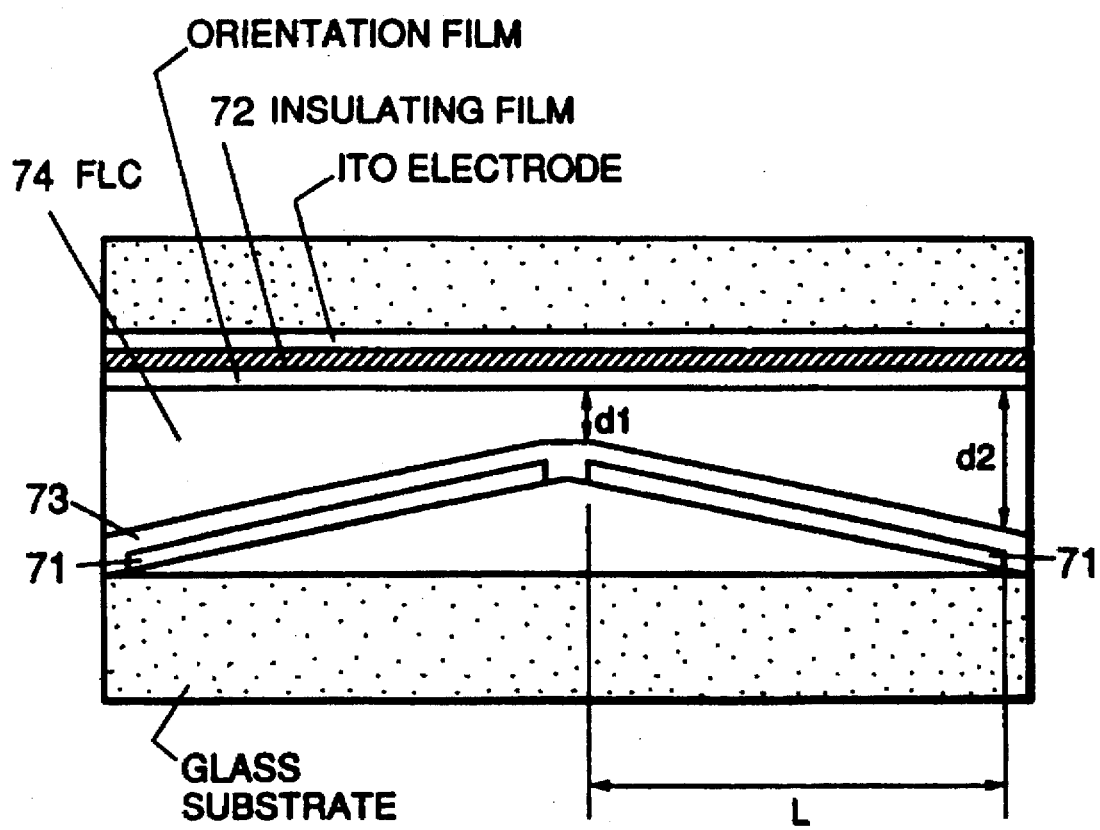
FIG. 12 is a diagram of a cell thickness gradient of the first embodiment.

The ridged substrate shown in FIG. 12 was formed as described below. A ridged shape such as that illustrated in FIG. 12 was transferred onto a glass substrate by using an acrylic UV setting resin, and an ITO film was formed on the shaped surface by sputtering. Further, ITO was patterned along the ridges and thin film of LQ-1802 having a thickness of about 250 µm was formed as in the case of the substrate shown in FIG. 11a. Rubbing was performed in the same direction with respect to the upper and lower substrates and with a rightward inclination of 8° from a normal to the ridges with respect to each of the substrates shown in FIGS. 11(a) and 11(b). The rubbing direction was thereby set in such a manner as to be rotated by 16° in a right-handed screw direction as viewed from the upper substrate to lower substrate from the lower substrate to the upper substrate. A liquid crystal shown in Table 1 was used.

TABLE 1

Liquid crystal A $$Iso \underset{81.8° C.}{\overset{82.3° C.}{\rightleftarrows}} Ch \underset{77.3° C.}{\overset{76.6° C.}{\rightleftarrows}} SmA^* \underset{}{\overset{54.8° C.}{\rightleftarrows}} SmC^*$$

$$-2.5° C. \updownarrow -20.9° C.$$

Cryst

| | |
|---|---|
| Ps = 5.8 nC/cm², Ps < 0 | 30° C. |
| Tilt angle = 14.3° | 30° C. |
| Δε—0 | 30° C. |

In the arrangement in accordance with this embodiment, the closest proximity domain distance d is about 20 mm. While the gradation display minimum unit in the case of the pixel arrangement as shown in (a1) to (a4) of FIG. 9 is $(d/l) \times 100 = (20/300) \times 100 = 6.7\%$ the gradation display minimum unit achieved by the present invention is $\{(d-n)/(m-l)\} \times 100 = \{(20 \mu m - 20 \mu m)/(210 \mu m - 300 \mu m)\} \times 100 = 0.63\%$.

Thus, the gradation accuracy is remarkably improved.

(Embodiment 2)

A closest proximity distance d depending upon the cell structure or the orientated state exists between domains of a ferroelectric liquid crystal, as described above with respect to Embodiment 1. If two domain walls exist on the same electrode and if the distance therebetween is smaller than d as shown in (c4) of FIG. 9, the domain walls can unite easily with each other. Also in a case corresponding to (a1) or (a4) of FIG. 9, there is a possibility of a union (contraction) of domain walls such as that shown in (c4) of FIG. 9. This may be caused if, in the case of (a1) of FIG. 9, a domain wall outside the pixel is white, or if, in the case of (a4) of FIG. 9, a domain outside the pixel is black. This embodiment is designed to also provide an area also inverted outside a pixel as shown in FIG. 13 in order to prevent a union of a domain wall from a pixel end even in a case where only one domain wall exists in the pixel.

Figure 13:
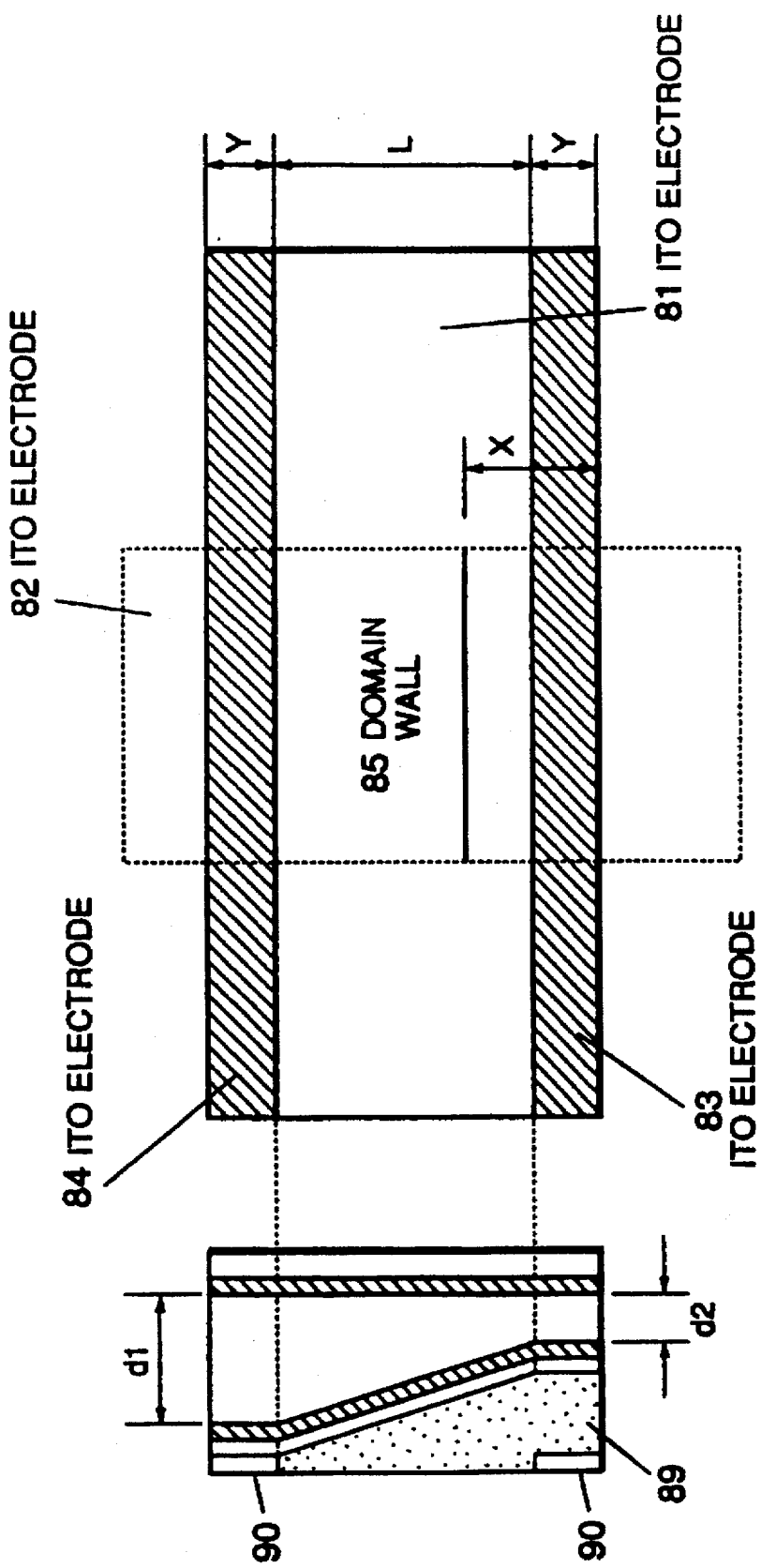
FIG. 13 is a diagram of a second embodiment of the present invention.

Referring to FIG. 13, an ITO electrode 81 has a surface sloped relative to a substrate, and an ITO electrode 82 is disposed to face the ITO electrode 81. The electrode 81 has a marginal portion (electrode margin) 84 formed along a thickest cell portion and another marginal portion 83 formed along a thinnest cell portion. These marginal portions are also formed of a conductor (electrode 81 and electrode margins 83 and 84 are electrically connected to each other and have the same potential) but the ITO electrode portions 83 and 84 are light-shielded and do not contribute to image information display. When a domain wall 85 is formed, writing is effected along the width X as illustrated and only a portion of Y - X is actually displayed. For prevention of a union of domains, it is desirable that the width Y is greater than the closest proximity distance d of domain walls. However, it has been confirmed that the prevention effect is sufficiently high even if Y is smaller than d in a case where the ITO electrodes 83 and 84 have no cell thickness gradation. Also, even in a case where the ITO electrodes 83 and 84 have a cell thickness gradation, and even if Y<d, the domain wall stability is remarkably improved in comparison with a case where Y is zero.

Referring again to FIG. 13, light shielding films 90 are formed on the glass substrate by depositing a Cr film to prevent transmission of light through the ITO electrodes 83 and 84, since the ITO electrodes 83 and 84 are provided for the purpose of stabilizing a domain wall in the pixel on the ITO electrode 85 and do not contribute to image information display. A liquid crystal device arranged as shown in FIG. 13 was manufactured as described below. Y was set to 20 µm, L was set to 300 µm, the thickness of the light shielding layer 90 was set to about 1,000 Å. A portion 89 was formed of a UV setting resin by molding, and an ITO film (1,400 Å) was formed thereon by sputtering. An orientation film LQ1802, a product from Hitachi Kasei, having a thickness of about 60 Å was formed on the ITO film. Rubbing was performed in the same direction with respect to upper and lower substrates. The rubbing direction was the same as the direction of a cell thickness gradient. As cell thicknesses, d1=1.65 µm and d2=1.1 µm were selected. The ferroelectric liquid crystal shown in Table 1 was used.

(Embodiment 3)

Figure 14:
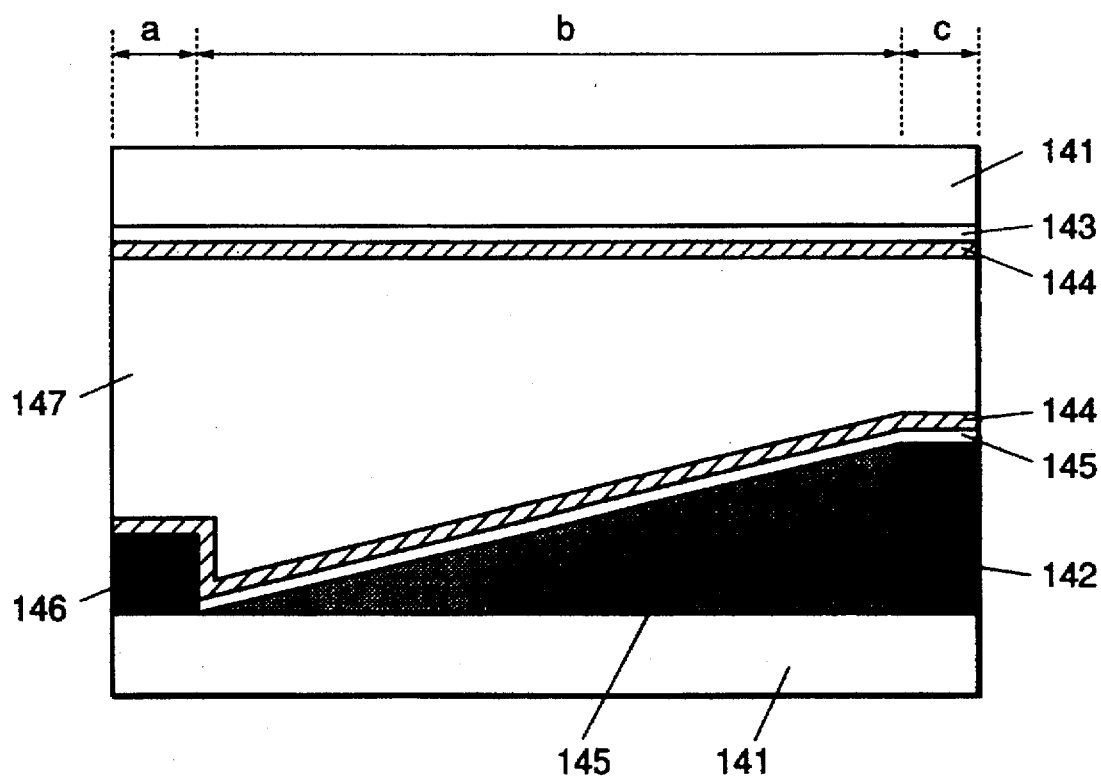
FIG. 14 is a diagram of a cell thickness gradient of a third embodiment of the present invention.

As a third embodiment, a cell arrangement such as that shown in FIG. 14 was realized. As shown in FIG. 14, a glass substrate 141, a metallic wiring 142, an ITO electrode 143, an orientation film 144, a UV setting resin 145 and a metallic wiring 146 were formed. The same ferroelectric liquid crystal 147 as that shown in Table 1 was used. Rubbing was performed in the same direction with respect to upper and lower substrates and from a right hand side to a left hand side as viewed in FIG. 14.

In this embodiment, light shielding layers also functioning as a metallic wiring were provided at gradient sides. The metallic wiring 142 and the metallic wiring 146 were formed by sputtering Mo and by pattern etching to have film thicknesses of about 5,000 Å and 3,000 Å, respectively.

The metallic wiring 142 has a difference in thickness to enable orientation to be effected uniformly. It is desirable that the metallic wiring 146 has a thickness of about 3,000 Å or less. It is also desirable, in terms of orientation control, that the metallic wiring 142 is formed so that the difference in level from the UV setting resin 145 is 3,000 Å or less (whereby rubbing unevenness can be prevented).

As described above, in a case where a plurality of domain walls are formed in a pixel to effect a gradation display, a sub pixel is used for gradation display so that the domain wall distance is not within the range in which an effect of instability, such as a union of domain walls, occurs. A good gradation display was achieved in this manner. The present invention is not limited to the cell thickness gradient method.

While the present invention has been described with respect to what presently are considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A liquid crystal device comprising:

a pair of electrode substrates facing each other;

a liquid crystal interposed between said electrodes; and a pixel comprising a first sub-pixel and a second sub-pixel smaller than said first sub-pixel, each of said first and second sub-pixels having a threshold gradient to provide a dark state domain and a bright state domain therein for gray scale display, said second sub-pixel having a longer size in a first direction and having an area larger than a domain with a width d, wherein said width d is a closest-proximity domain distance and said pixel is driven so as not to form in said first sub-pixel a domain having a width smaller than said width d, the threshold gradient of each of said first and second sub-pixels is arranged along said first direction, and said first and second sub-pixels are arranged in a direction intersecting said first direction.

2. A ferroelectric liquid crystal device according to claim 1, wherein the threshold gradient is provided by a cell thickness gradient.

* * * * *